(12) United States Patent
Newell et al.

(10) Patent No.: US 7,583,776 B2
(45) Date of Patent: Sep. 1, 2009

(54) PORTABLE MULTIPLICITY COUNTER

(75) Inventors: Matthew R. Newell, Los Alamos, NM (US); David Carl Jones, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 11/673,679

(22) Filed: Feb. 12, 2007

(65) Prior Publication Data

US 2008/0192881 A1    Aug. 14, 2008

(51) Int. Cl.
*G06M 7/00* (2006.01)
(52) U.S. Cl. .............................. 377/6; 377/11
(58) Field of Classification Search ........................ None
See application file for complete search history.

(56) References Cited

U.S. PATENT DOCUMENTS

| | | | |
|---|---|---|---|
| 3,937,984 A | 2/1976 | Fry | |
| 4,837,705 A * | 6/1989 | Mussler et al. ................ 702/78 |
| 4,920,271 A * | 4/1990 | Arnone ................... 250/390.01 |
| 5,524,129 A * | 6/1996 | Pettigrew et al. ................ 377/6 |
| 6,333,958 B1 * | 12/2001 | Stewart et al. ................. 377/10 |
| 6,341,150 B1 * | 1/2002 | Ivanov et al. ................ 376/159 |
| 6,970,530 B1 | 11/2005 | Wang et al. | |
| 2006/0146977 A1 * | 7/2006 | Rowland et al. .............. 377/10 |

* cited by examiner

*Primary Examiner*—Cassandra Cox
(74) *Attorney, Agent, or Firm*—Matthew F. Lambrinos; Kermit D. Lopez; Luis M. Ortiz (57) ABSTRACT

A portable multiplicity counter has signal input circuitry, processing circuitry and a user/computer interface disposed in a housing. The processing circuitry, which can comprise a microcontroller integrated circuit operably coupled to shift register circuitry implemented in a field programmable gate array, is configured to be operable via the user/computer interface to count input signal pluses receivable at said signal input circuitry and record time correlations thereof in a total counting mode, coincidence counting mode and/or a multiplicity counting mode. The user/computer interface can be for example an LCD display/keypad and/or a USB interface. The counter can include a battery pack for powering the counter and low/high voltage power supplies for biasing external detectors so that the counter can be configured as a hand-held device for counting neutron events.

16 Claims, 11 Drawing Sheets

RUN DISPLAY

```
    HANDHELD MULTIPLICITY REGISTER HHMR
------------------------------------------------

CNT TIME            10.00 (s)
 GATE                50.00(μs)
 PREDELAY            4.50 (μs)
 HIGH VOLTAGE        1690 (V)

----------- MEASUREMENT RESULTS ----------

SECONDS             5.60 (s)
 HIGH VOLT           1680 (V)
 R+A                 2390
 ACC                 5768
 TOTALS              12345
 AUX1                12345
 AUX2                12345
                              BATTERY=78%
```

FIG. 11A

SETUP DISPLAY

```
 COUNT NAME:            10.00      SECONDS
 HV SET POINT:          1680       VOLTS
 GATE WIDTH:            50.00      μSECONDS
 PRE DELAY:             4.50       μSECONDS
 FAST ACCIDENTALS       OFF
 SHOW REALS:            OFF
 DISPLAY: (DATA/MULTI)  DATA

ABOUT: ...
 EXIT:
```

PORTABLE MULTIPLICITY COUNTER

STATEMENT REGARDING FEDERAL RIGHTS

This invention was made with government support under Contract No. W7405-ENG-36 awarded by the U.S. Department of Energy. The government has certain rights in the invention.

TECHNICAL FIELD OF THE INVENTION

Embodiments relate generally to multiplicity counters, and, more particularly, to portable multiplicity counters including hand-held multiplicity counters. Embodiments also relate to shift register multiplicity counters for high rate data acquisition. Also, embodiments relate to multiplicity counters for counting neutron events. Furthermore, embodiments relate to methods of manufacturing such multiplicity counters and methods of operating same.

BACKGROUND OF THE INVENTION

Multiplicity counting techniques are used to acquire time correlated data at high rates enabling processing of large volumes of signal pulse data into a more useable form. The technique is generally useful for high-speed processing of digital data and, in particular but not exclusively, for acquisition of neutron events during non-destructive mass assay of nuclear material, such as uranium and plutonium in many forms. During the fission process, multiple neutrons are emitted within a very short time frame, that is, in coincidence. The number of events detected in coincidence determines the multiplicity of the event.

In neutron multiplicity counting, voltage pulses corresponding to detected neutron events are inputted into a shift register that counts and processes the pulses. Counting and processing large volumes of neutron event data is required to minimize statistical errors.

U.S. Pat. No. 6,333,958, entitled "Advanced Electronics for Faster Time-Correlation Analysis of Pulse Sequences", issued on Dec. 25, 2001 to Stewart et al. teaches that an accidentals register strobe generated from a fixed clock frequency can be used to replace the standard 5 ms accidentals strobe to improve the measurement precision of a shift register coincidence counter. This existing technology is very complex, requires many components to function properly and is prone to failures due to the complex interconnects. This technology is also very expensive to produce, and due to its slow speed (pulse rates greater than 4 MHz cannot be measured) cannot be used with today's high count rate instruments.

U.S. Pat. No. 4,920,271, entitled "Multiple channel programmable coincidence counter", issued on Apr. 24, 1990 to Gaetano J. Amone. This coincidence counting device focuses on the minimization of dead-time using high speed clocks and parallel input channels. This device uses an antiquated Computer Automated Measurement and Control (CAMAC) data acquisition and control interface and therefore is difficult to use with current measurement instruments. One drawback of this device is that dead-time corrections cannot not be accomplished to correct measured counts for the front-end electronics dead-time.

U.S. Pat. No. 4,580,056, entitled "Neutron event counting circuit" issued on Apr. 1, 1986 to Kaiser et al, discloses a counting circuit which is a very simple system that will not work with today's modern neutron measurement systems. This system implements a one-shot multivibrator circuit for a front-end noise filter which will lead to increased loss in input pulses. This system counts both totals events and correlated events but does not count multiplicity events.

The multiplicity counters of the prior art are expensive, complex, and are unreliable due to their complexity. Also, due to their limited maximum input rate, these counters cannot be utilized effectively with high rate count instruments.

BRIEF SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect to provide a portable multiplicity counter which can be used with ease to perform measurements.

It is, therefore, another aspect to provide a method of manufacturing a portable multiplicity counter.

The aforementioned aspects of the invention and other objectives and advantages can now be achieved as described herein.

According to one aspect, a portable multiplicity counter comprises a housing and signal input circuitry, processing circuitry and a user/computer interface integral or disposed in said housing. The processing circuitry is configured to be operable via the user/computer interface to count input signal pulses receivable at the signal input circuitry and record time correlations thereof.

Integrating the processing circuitry, signal input circuitry and a user/computer interface in a housing to form a portable multiplicity counter enables an operator to conduct multiplicity count measurements at a facility easily and quickly by simply carrying the counter to the test facility, electrically connecting the portable multiplicity counter to the detector or other apparatus generating the signal pulses to be measured and operating the counter via the user/computer interface.

The processing circuit comprises a controller operably coupled to shift register circuitry. The processing circuitry can be configured to count and record the input pulses based on measurement parameters configurable via the user/computer interface. The shift register circuitry can be adapted to count and record the input signal pulses in a total counting mode, coincidence counting mode and/or a multiplicity counting mode.

The shift register circuitry can be implemented in a field programmable gate array integrated circuit. Controller and shift register circuitry can be respectively implemented as an integrated circuit microcontroller and an integrated circuit field programmable gate array. Forming the microcontroller and field programmable gate array as single integrated circuits reduces circuit complexity and enables the controller and shift register circuitry to be fabricated on a single main printed circuit board. For these reasons, the portable multiplicity counter can be fabricated more easily and at low cost.

A high voltage power source and/or a low voltage power source can be disposed in the housing for electrically biasing one or more external detectors. A battery power supply can be disposed in the housing for powering the hand held multiplicity counter and, if necessary, can include a rechargeable battery pack and power management system. Providing these high/low voltage power sources and battery power in the housing enables the multiplicity counter to be configured as a convenient hand-held counter which can be simply carried to the test site and connected to the detector to count pulses without the need for facility power or additional external detector biasing. The hand-held multiplicity counter can be adapted for counting pulses other than neutron events.

The input signal circuitry can comprise a plurality of input channels and signal conditioning circuitry operable via the user/computer interface. The user interface can comprise a graphical user interface such as an LCD display and keypad carried on the housing. The computer interface can comprise a USB interface. The input circuitry can be configured to operate in low voltage differential or standard TTL input modes which are selectable via the user/computer interface.

According to another aspect, a hand-held multiplicity counter for counting neutron events comprises a housing, signal input circuitry disposed in the housing, a user/computer interface integral with the housing, and processing circuitry, also disposed in the housing, and configured to count input signal pulses receivable at the signal input circuitry and record time correlations thereof.

According to yet another aspect, a method of manufacturing a portable multiplicity counter comprises integrating signal input circuitry, processing circuitry and a user/computer interface in a housing, and configuring the processing circuitry to be operable via the user/computer interface to count input signal pulses receivable at the signal input circuitry and record time correlations thereof. The processing circuit can comprise a microcontroller and shift register circuitry operably coupled thereto. Also, the method of manufacturing can include configuring the processing circuitry to count and record the input pulses based on measurement parameters configurable via the user/computer interface.

According to yet another aspect, a method of operating a portable multiplicity counter, the method comprises receiving input signal pulses; and counting the received input signal pulses and recording time correlations thereof.

The method can further comprise configuring measurement parameters via a user/computer interface. The step of counting the received input signal pulses and recording time correlations thereof can further comprise counting the received input signal pulses and recording time correlations thereof based on the measurement parameters. The method can further comprise retrieving measurement data corresponding to the input signal pulse time correlations.

The step of counting the received input signal pulses and recording time correlations thereof can further comprise counting the received input signal pulses and recording time correlations thereof using a shift register comprising a field programmable gate array integrated circuit. The step of configuring the measurement parameters can comprise configuring the measurement parameters using a user interface/computer and a microcontroller operably connected to the field programmable gate array integrated circuit. The step of retrieving the measurement data can comprise retrieving the measurement data via the user/computer interface using the microcontroller.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The multiplicity counter according to the illustrative embodiments provides an approach to enable reliable multiplicity counting to be performed with ease using a portable device. Furthermore, the approach can provide a multiplicity counter which is capable of being hand-held in use and/or used in semi-permanent installations and, if need be, which is capable of being used in conjunction with modern high rate instruments and without the requirement for facility power.

By way of example, the illustrative embodiment of the portable multiplicity counter is adapted for use in non-destructive assay of nuclear material. In such applications, the input signal pulses to be counted are voltage pulses representing neutron events which are typically detected by one or more slab detectors of a $He_3$ detector system surrounding a sample of interest with the output of these detectors electrically connected to the counter to determine coincidence rates. However, the multiplicity counter can be used in other applications for the purpose of multiplicity counting signal pulses representing events other than neutron events.

Figure 1:
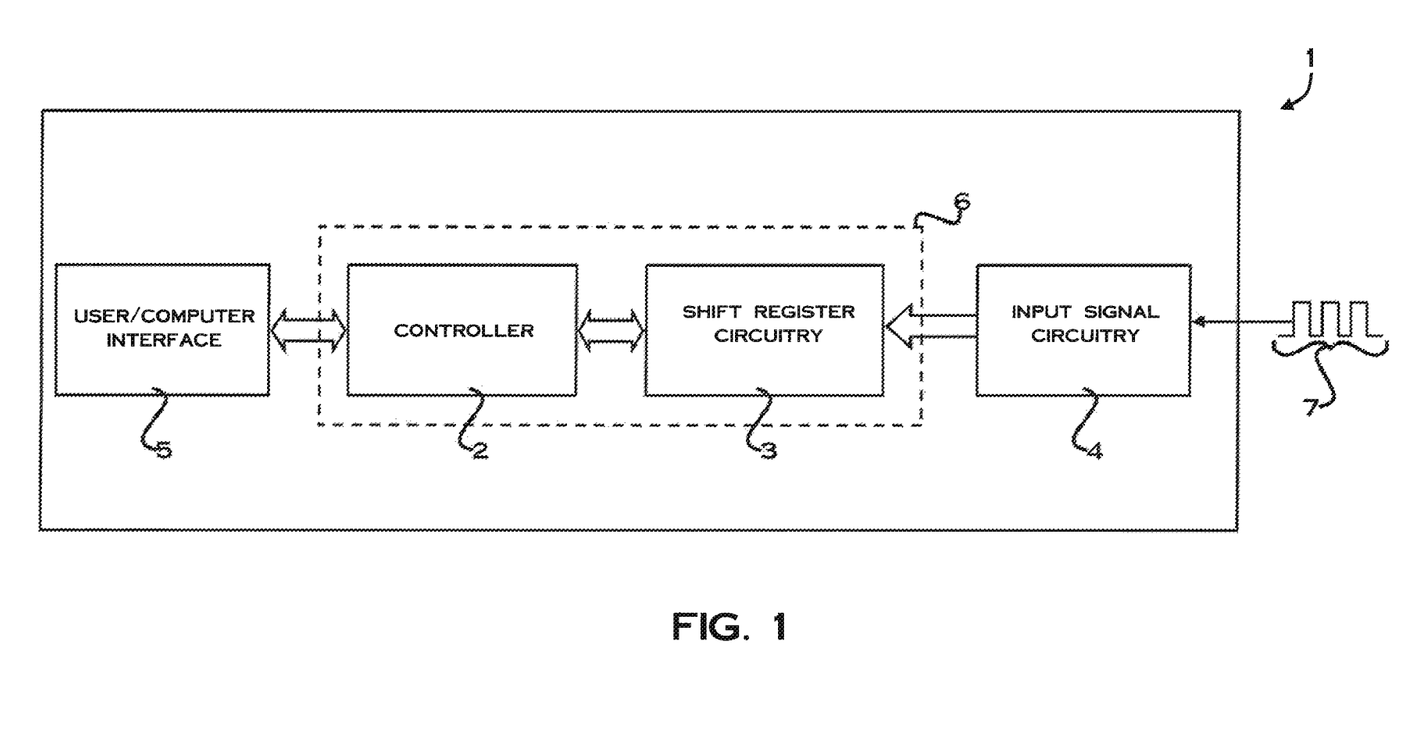
FIG. 1 illustrates a simplified block diagram of a hand-held multiplicity counter according to a preferred embodiment.

Referring to FIG. 1 of the accompanying drawings, which illustrates a simplified block diagram of a hand-held multiplicity counter according to one embodiment, as a general overview, integrated processing circuitry 6, signal input circuitry 4 and a user/computer interface 5 are integrated into a portable hand-held device 1. Signal input circuitry 4 is adapted to receive external input signal pulses 7 and condition them. Processing circuitry 6 is configured to be operable via the user/computer interface 5 to count the input signal pluses receivable at the signal input circuitry and record time correlations of the pulses.

Processing circuitry 6 has a controller 2 and shift register circuitry 3 operably connected to the controller and the output of the signal input circuitry 4. As will be explained in more detail below, the processing circuitry is adapted and arranged such that an operator can configure the desired count measurement parameters, operate the shift register 3 to record time correlated electronic pulses based on the configured measurement parameters, and retrieve measurement data all via user/computer interface 5.

Advantageously, integrating the processing circuitry 6, signal input circuitry 4 and a user/computer interface 5 in a portable housing provides a fully portable counter. An operator can conduct multiplicity count measurements at a facility easily and quickly by simply carrying the counter to the test facility, electrically connecting the portable multiplicity counter to the detector or other apparatus generating the signal pulses to be measured and operating the counter via the user/computer interface 5.

Figure 2:
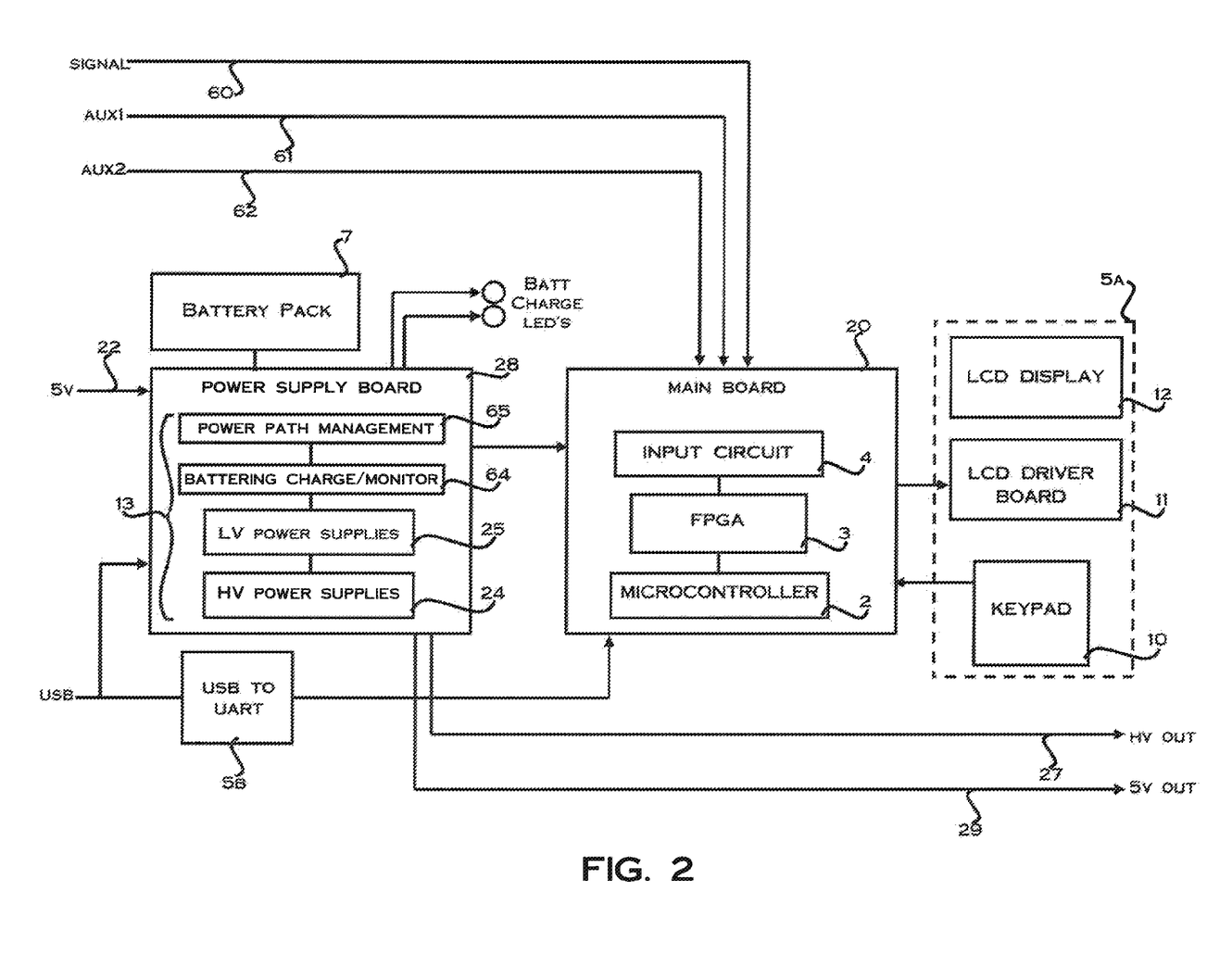
FIG. 2 illustrates a detailed block diagram of a hand-held multiplicity counter according to an embodiment.

Referring now to FIG. 2, which illustrates a more detailed block diagram of the hand-held multiplicity counter 1 according to one embodiment, by way of example, controller 2 and shift register circuitry 3 are respectively implemented as a single integrated circuit microcontroller 2 and a single integrated circuit field programmable gate array 3. Forming the microcontroller and field programmable gate array as single integrated circuits reduces circuit complexity and enables the controller and shift register circuitry to be fabricated on a single main printed circuit board 20. For these reasons, the hand-held multiplicity counter 1 can be fabricated more easily and at low cost. However, if need be, the controller 2 and shift register 3 can alternatively be implemented in other types of integrated circuits.

Input signal circuitry 4 has a plurality of input channel circuits respectively electrically connected to inputs of the field programmable gate array 3. In the counter 1 of the illustrative embodiment there are three input circuits (not shown) which are configured to receive and condition respective signal-in 60, aux1 61 and aux2 62 electronic input pulses provided via corresponding input channels of the hand-held counter and two spare input circuits. In alternative embodiments there can be more or less inputs as desired. Also, in the counter 1 of the illustrative embodiment, user/computer interface 5 is implemented as a user interface 5A and a graphical user interface 5B. However, in alternative embodiments, one or the other of the user and computer interfaces can be omitted. Graphical user interface 5A is in the form of a touch keypad 10 and LCD display/display driver 11, 12, and computer interface 5B, is a USB interface 5B. LV power supplies 25 are arranged to power the microcontroller 2, field programmable gate array integrated circuit 3, and user/computer interfaces 5A, 5B.

Referring in more detail to microcontroller 2, this controller is configured to control all functions of the hand-held multiplicity counter 1. Preferably, the microcontroller 2 is an 8 bit microcontroller, such as an 8051 microcontroller. Adopting a single 8 bit microcontroller eliminates the need for masters processor boards required with more complex microcontrollers allowing smaller packaging. Utilizing an 8 bit microcontroller is also advantageous because such controllers are inexpensive and less complex enabling the counter to be produced at even lower cost. Operating software is configured to run on the microcontroller 2 to cause the microcontroller to monitor the keypad 10 for input, to send data to the LCD display 12 for display, to communicate with an external computer through the USB interface 5B, to control power supply 13, to send measurement parameters to the field programmable gate array 3 and to retrieve data from the gate array 3. In the illustrative embodiment, different firmware software programs are configured to run on the multiplicity counter: an FPGA program, a main microcontroller program and an LCD interface program. Additionally, an International Atomic Energy Agency (IAEA) accepted neutron coincidence counting (INCC) software of Los Alamos National Laboratories (LANL), New Mexico, USA is used to communicate with the multiplicity counter via the USB port.

Referring in more detail to the field programmable gate array 3, the gate array is configured to receive logic level input pulses from respective input channel circuits and record the time correlation of these inputs. A clock located on the main board is operably coupled to the field programmable gate array 3 and microcontroller 2. The field programmable gate array is configured to operate with internal clock rates of both 50 MHz and 100 MHz and the microcontroller at 50 MHz to enable the counter to count pulse rates up to 50 MHz.

Figure 3:
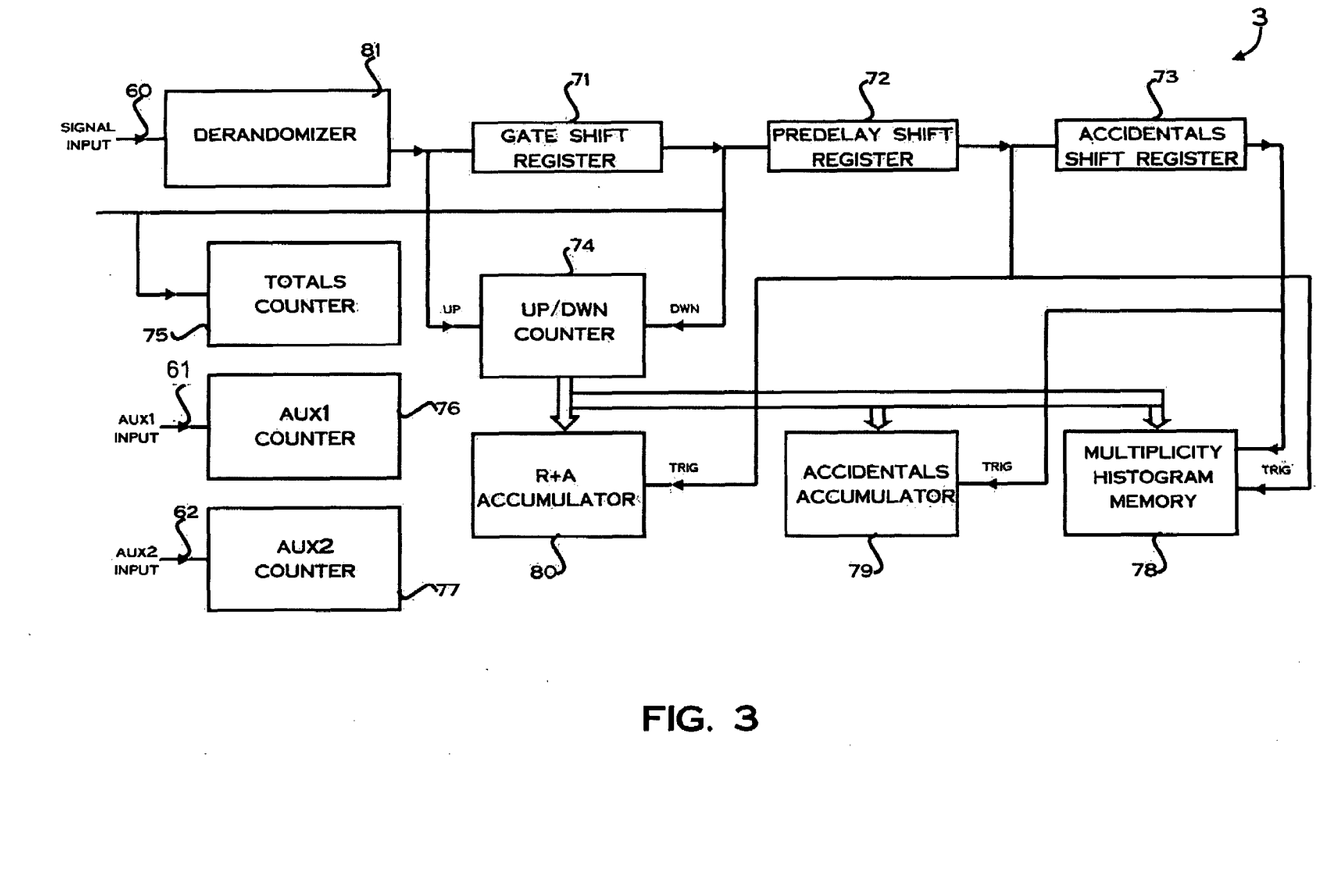
FIG. 3 illustrates a block diagram of a field programmable gate array shift register of the hand-held counter of FIG. 2 according to one embodiment.
Figure 4:
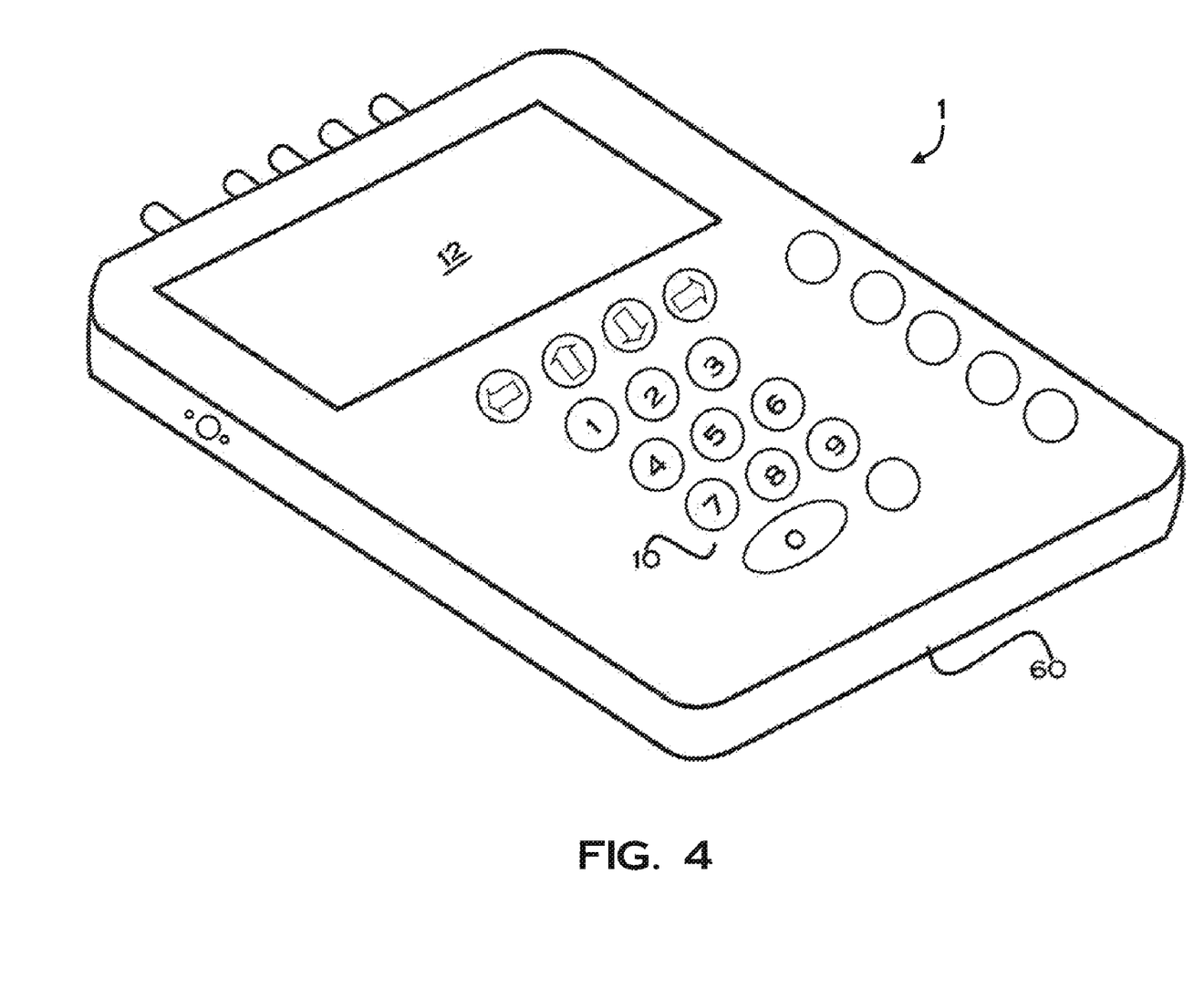
FIG. 4 illustrates a perspective view of the hand-held multiplicity counter of FIG. 2 packaged according to one embodiment.
Figure 5:
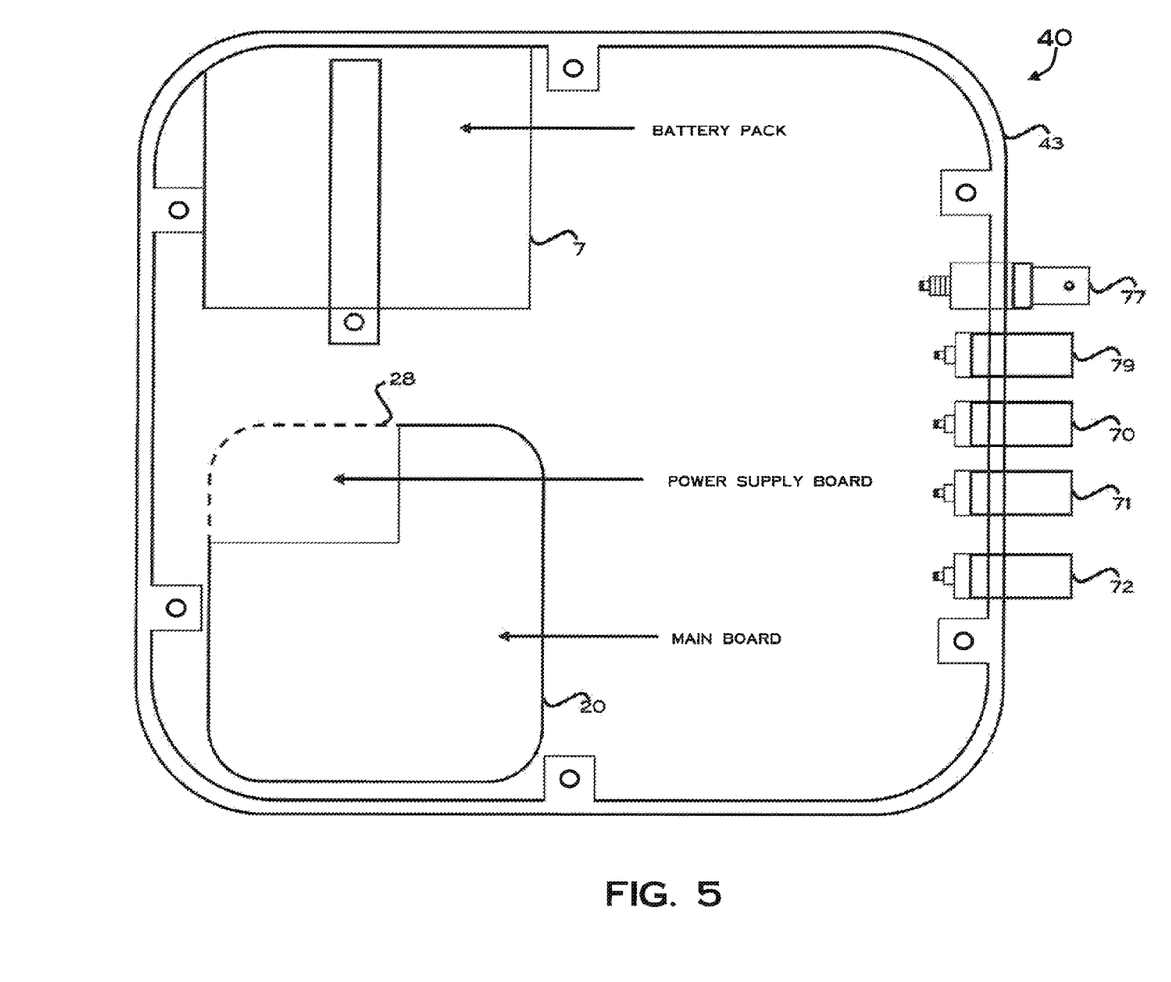
FIGS. 5 and 6 respectively illustrate a top plan view and an exploded side elevation view of the main chassis portion of the hand-held multiplicity counter shown in FIG. 4.
Figure 6:
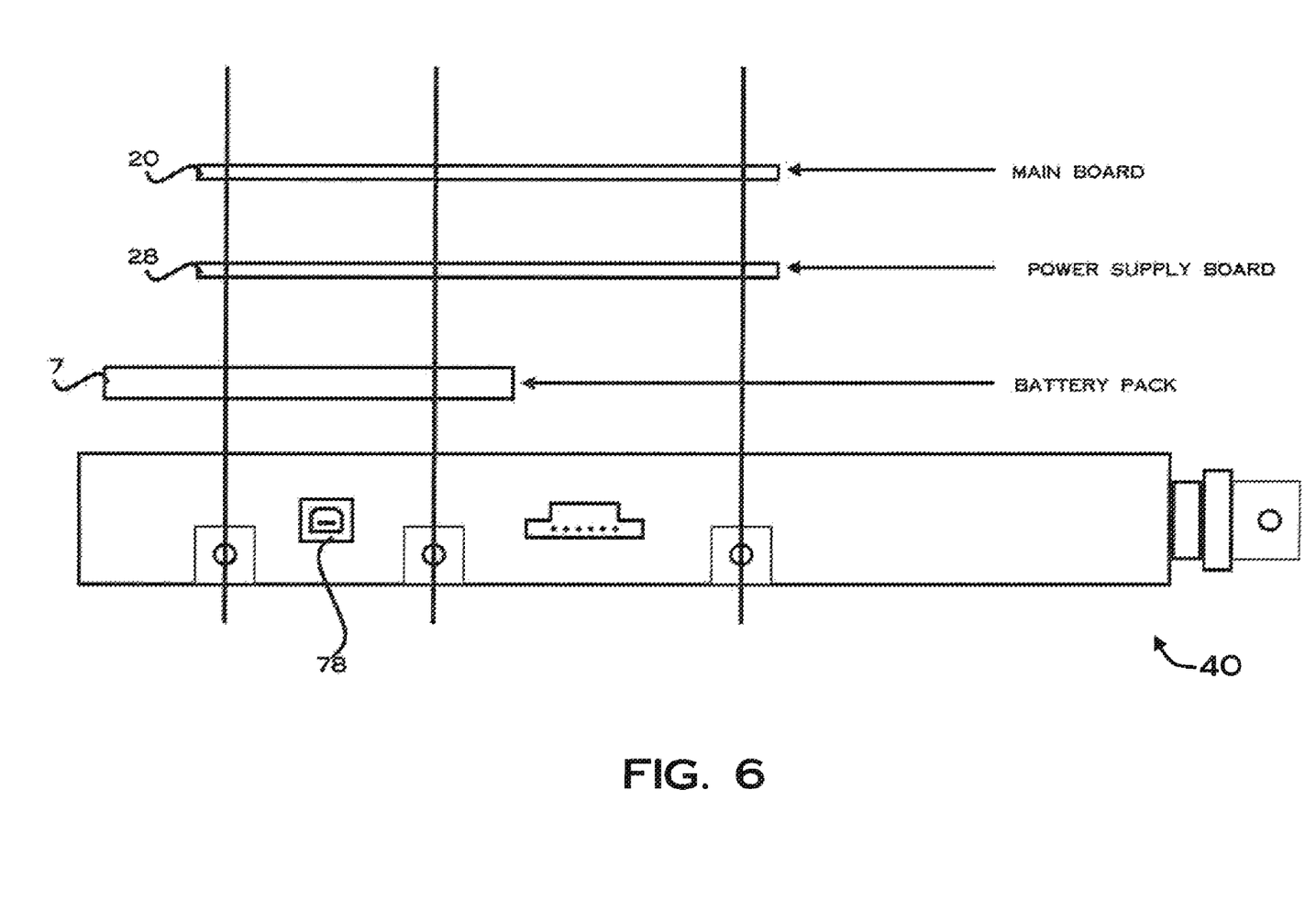
Figure 7:
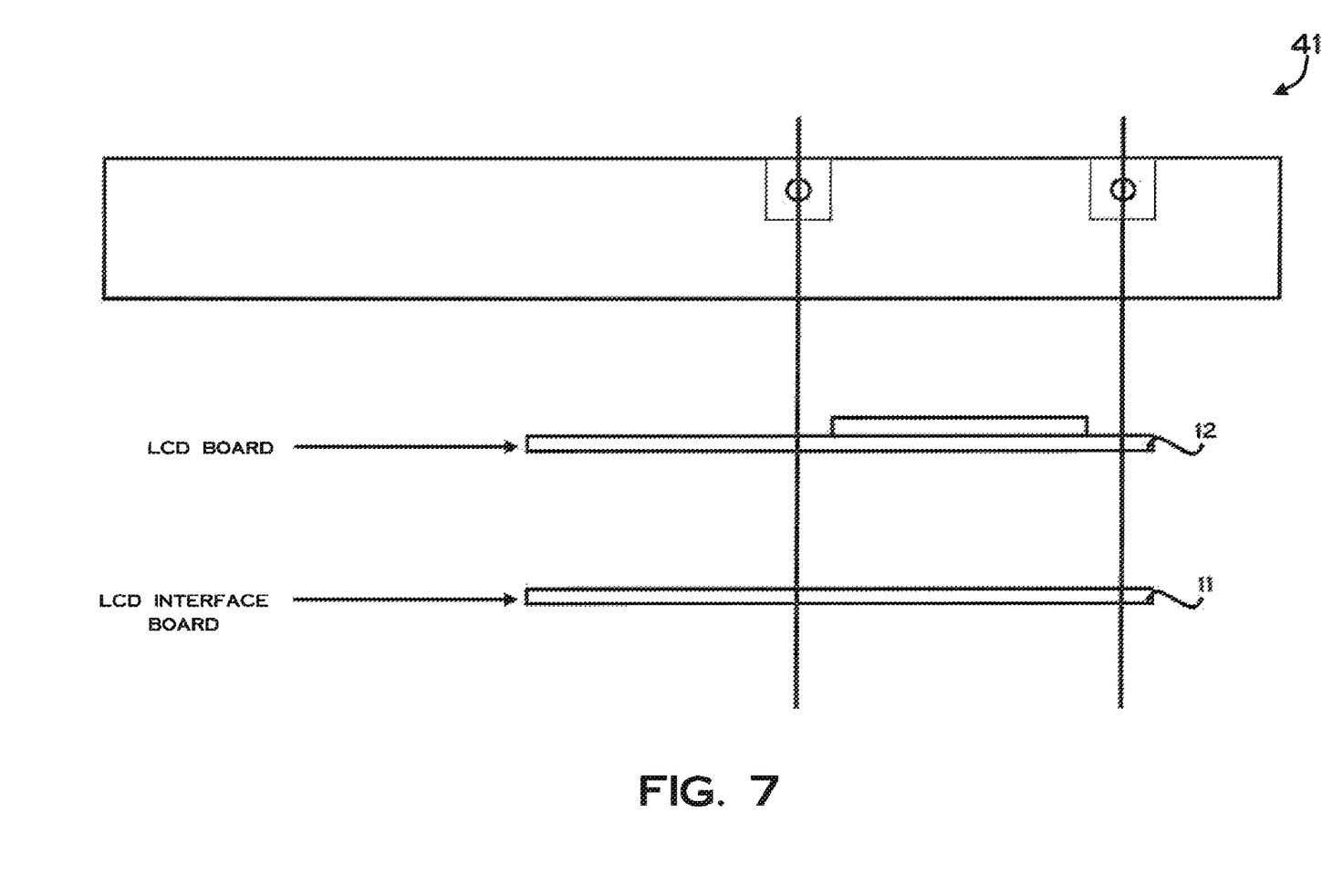
FIG. 7 illustrates an exploded side elevation of the cover portion of the hand-held multiplicity counter shown in FIG. 4.

The field programmable gate array 3 contains all the counting and data manipulation circuitry required to enable the shift register to count in a total counting mode, coincidence counting mode and/or a multiplicity counting mode, as indicated generally in the block diagram of the FPGA of FIG. 3. This circuitry can be implemented on any field programmable gate array capable of running at 100 MHz. The field programmable gate array 3 includes a shift register in the form of three shift register memories; gate 71, predelay 72 and accidentals 73. These shift registers are typically implemented with 1 bit wide Random Access Memory (RAM) modules within the FPGA. Each shift register is used to store the total number of pulses that occur within a pre-programmed time. This information is used to determine the coincidence and multiplicity information The other main components of the FPGA are the derandomizer 81, counter circuits 74-77, multiplicity memory circuit 78 and accumulator circuits 79, 80. Dead-time corrections are accomplished with the pre-delay shift register 72 to correct measured counts for the front-end electronics deadtime. The gate shift register 71 is used to determine the time correlation of events, the accidentals shift register 73 is used to determine the un-correlated events, the multiplicity memory circuit 78 stores the histogram of the correlated and un-correlated events, the accumulators 79, 80 keep a running total of the number of correlated and un-correlated events and the counters 74-77 are used to count the total number of events. The general principle of operation of the shift register circuitry is known in the art (see for example "Application Guide to Neutron Multiplicity Counting", LA-13422. M, N. Ensslin, et. al., November 1998 which is incorporated herein by reference).

The field programmable gate array 3 stores the total number of pulses, coincidence timing of the pulses and multiplicity timing up to 256 orders of all pulses. In totals counting mode, the total number of input events seen on each input channel 60-62 are counted and stored as totals data. In coincidence counting mode, the number of events that occur on the SIGNAL_IN channel 60 within a user specified time from the occurrence of the last event are counted and stored as coincidence data. This counting and storing of the number of events that occur within a user specified time from the occurrence of the initial (or last) event produce a measure of the correlation of input events. No coincidence data is stored for the AUX1 and AUX2 inputs 61, 62. In multiplicity counting mode multiplicity data is stored as a histogram of the correlation of input events. The histogram is the sum of the number of times events occur without any other events within a programmed time; the number of times 2 events occur within the specified time, the number of times 3 events occur, 4 events and so on up to 255 events. The coincidence data is fed into the histogram memory circuit 78 to store the number of occurrences and the number of multiple events that happen within a user specified time. No multiplicity data is stored for the AUX1 and AUX2 inputs.

The count time, pre-delay and gate of the field programmable gate array 3 are programmable via the user and computer interfaces 5A, 5B. Typically, the resolution of the count time is 1/10 sec, the pre-delay is adjustable from 40 ns to 1023.75 µs in 20 ns steps and the gate is adjustable from 40 ns to 1024 µs in 20 ns steps. Long delay and data register parameters are preconfigured. Typically, the long delay is fixed from 5 to 10 ms. Also typically, the totals, R+A, Accumulator, Accidentals Accumulator, AUX1 and AUX2 data registers, 80, 79, 76 and 77 are each preconfigured as 48 bit synchronous counter read in three 16 bit words and the multiplicity data register as 768 32-bit words read in pairs of 16 bit words. (256 R+A, 256 Acc, 256 R+A and Acc).

Referring now in more detail to the input signal circuitry 4 of FIG. 2, each of the three input circuits contains input pulse shaping circuitry and input mode selection circuitry as is known in the art. Typically, pulse pair resolution can be set to be less than 20 ns. The SIGNAL-IN channel 60, AUX 1 and AUX 2 channels are configured to accept respective corresponding signals in differential or standard TTL signal input modes from external preamp/discriminators located within the detector to which the multiplicity counter is connectable. The low voltage differential or standard TTL input mode for each channel is selectable via the user and computer interfaces. Typically, minimum pulse widths can be 40 ns or greater, minimum pulse amplitudes can be 1.75 V or greater.

Referring now in more detail to the USB interface 5B of FIG. 2, this interface is a USB to UART bridge configured to convert serial communications to and/or from the microcontroller 2 to USB communications enabling an external computer to be connected to the USB port of the hand-held counter 1 and remotely run the counter operating software and thereby remotely control the counter. Additionally, the USB interface eliminates the serial port existing on prior art registers. Computer interfaces other than a USB interface can alternatively be employed to convert communications to and/or from the microcontroller 2 to other communication formats which may be required by particular external computers to enable them to run the counter remotely.

Referring now in more detail to the touch keypad 10 and LCD display 12 of FIG. 2, keypad 10 is a 20 button (four by five) membrane switch keypad with LCD window operably connected to the microcontroller 2 via keyboard interface 21. The keypad is used to turn the hand-held multiplicity counter 1 on and off and as the main user interface. The LCD display 12 is an off-the-shelf 240×128 pixel LCD display with backlight. The Display driver 11 (or interface board) between main board 20 and the LCD display 12 contains another microcontroller (not shown), such as another simple 8-bit microcontroller processor identical to that used as the microcontroller 2 on the main board, configured to handle the display driver 11. The LCD microcontroller runs the LCD interface program which is used to convert RS232 commands sent by the main microcontroller 2 to parallel port commands recognized by LCD display board. Using this Keypad-LCD Display 10-12 arrangement further reduces the complexity and cost of manufacture of the hand-held multiplicity counter 1. Nevertheless, graphical user interfaces other than the keypad 10 and LCD display/driver 11, 12 arrangement of the illustrative embodiment can alternatively be employed in the hand-held multiplicity device. For example, in an alternative embodiment, a touch sensitive display screen can be used instead of a keypad and LCD display.

The power supply circuitry 13, which can be powered either by a remote power source via a DC input 22 or by an internal rechargeable battery pack 7, includes DC-to-DC converters arranged to provide all the power supplies required to operate the electrical components of the hand-held multiplicity counter 1. The battery pack 7 is rechargeable via the DC power input 22. An example of a suitable battery pack is a 5.4 Amp-hour Lithium Ion battery which is rechargeable via a 5V DC input 22 and which, when fully charged, can keep the hand-held multiplicity counter operating for 8 hours of normal operation. Battery management hardware 64, 65, also included in the power supply circuitry 13, is configured to monitor the Li-ion or other type of battery pack 7 and keep it properly charged. Providing the battery pack and management hardware is advantageous in that it ensures the hand-held counter can function autonomously without being affected by external power and communication variations.

Also included in the power supply circuit 13 in addition to the LV power supplies 25 is a High Voltage (HV) power supply 24 which is provided for electrical connection, via an HV output 27 of the counter, to detectors so that the detectors can be biased to generate the electronic input pulses. Typically, the HV is adjustable by an operator, via the keyboard-display 5A and the USB interface 5B, from 0V to 2000V in 1V steps with an accuracy of +/−0.05 percent. The LV power supplies 25 are provided for powering the internal electronics including the main board and LCD interface as well as external Neutron counter preamps via DC output 29.

Power supply circuitry 13 including the HV and LV power supplies and battery pack management hardware are arranged on the power supply PCB 28.

According to one embodiment, the portable multiplicity counter 1 can be manufactured by integrating the signal input circuitry, processing circuitry and a user/computer interface in the housing, and configuring the processing circuitry to be operable via the user/computer interface to count input signal pluses receivable at the signal input circuitry and record time correlations thereof.

By way of example of a method of manufacturing the counter, referenced will now be made to FIGS. 4-8 which illustrate various views of the hand-held multiplicity counter packaged according to one embodiment. The counter 1 has a cover 41 and base or chassis 40 which are attached together to form a compact housing 60 defining a cavity in which the main and power supply boards 20, 28 including their associated components together with the battery pack 7 are mounted. Dimensions of the housing for hand-held applications are typically no greater than about 26 cm×21 cm×3 cm and the hand-held counter weight is typically not more than 2 kg enabling the user to carry the hand-held counter into measurement areas and use the counter with ease. The LCD display and interface boards and the pushbutton keypad 10 are integrated in the cover 41 or front panel of the counter. Connectors are mounted in the base sidewall 43 for electrically connecting the interior components to external apparatus. In particular, +5V output 79 and the signal input BNC connector 70, two auxiliary scalar BNC's 71, 72, high voltage out SHV connector 77, and a USB connector 78 for communications are provided.

Figure 8:
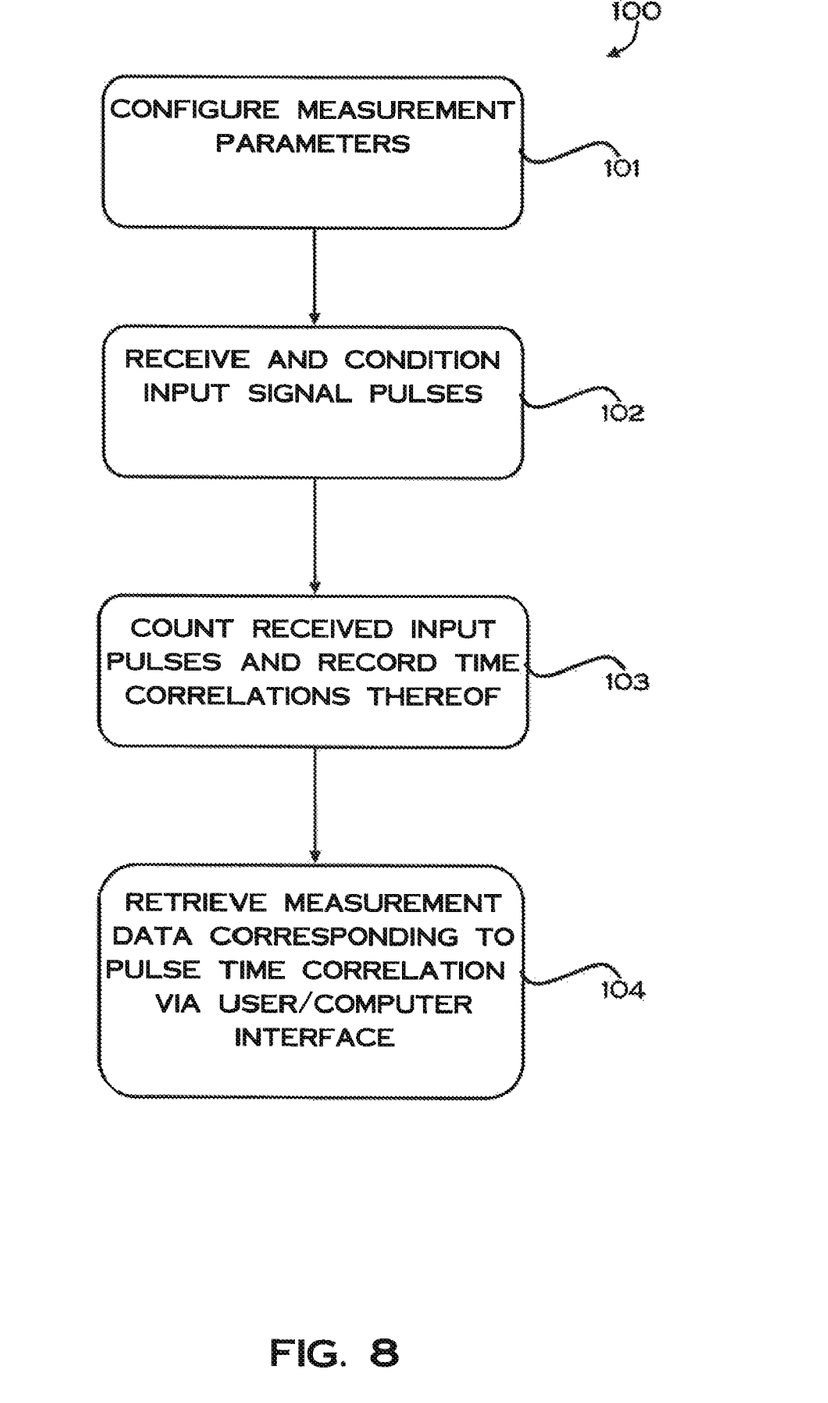
FIG. 8 illustrates a flow diagram outlining a method of operating a hand-held multiplicity counter according to one embodiment.

A method of operation of a hand-held multiplicity counter according to one embodiment will now be described by way of example with reference to the hand-held multiplicity counter of the illustrative embodiment of FIGS. 1-7. FIG. 8 represents a flow diagram outlining the method of operation. As a general overview, method 100 is initiated by configuring the desired count measurement parameters, as indicated in process step 101. Thereafter, input signal pulses are received and, if necessary, conditioned, (process step 102). These pulses are counted and time correlations of the input signals are recorded based on the measurement parameters (process step 103). The measurement data corresponding to the input signal pulse time correlations is retrieved as or after the measurements are being conducted (process step 104).

Process step 101 is optionally. For example, this step could be omitted if the measurement parameters were already preconfigured in the counter as may be the case for a simple hand held counter in which the measurement parameters are preset and non-programmable.

For the purpose of explaining method 100 in more detail, let us assume by way of example that hand-held multiplicity counter 1 has been carried to the test field by an operator and that the operator has connected the counter 1 to a neutron detector system to perform holdup measurements, area monitor measurements or coincidence measurements on a sample of interest. In this example, the +5V output BNC connector is connected to operate the neutron counter preamps, the high voltage out SHV connector is connected to the neutron detector to bias the detector, and the signal input BNC connectors and two auxiliary scalar BNC's are connected to the corresponding detector outputs.

Figure 9:
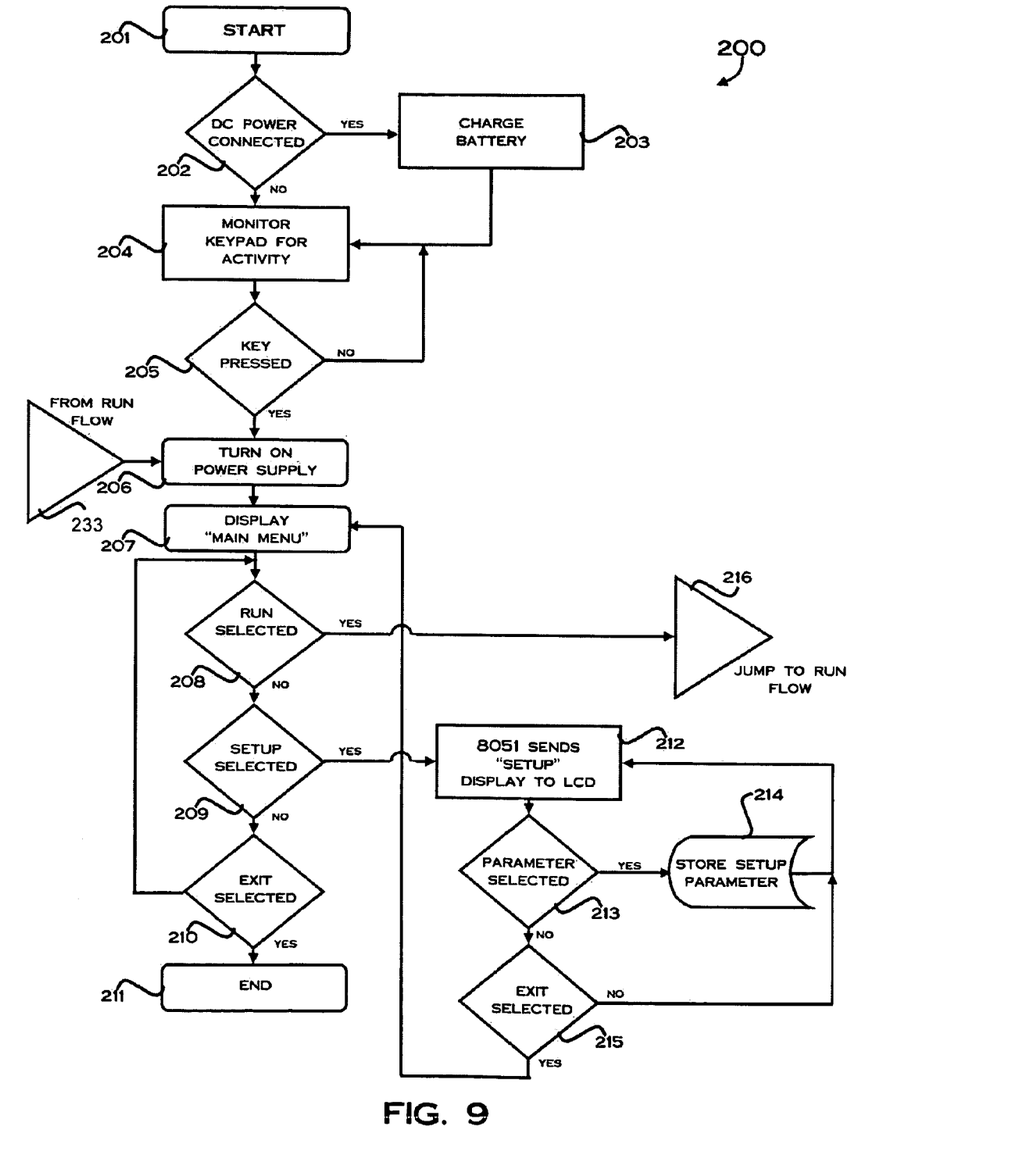
FIGS. 9 and 10 respectively illustrate main flow and run flow methods of operation of the hand-held multiplicity counter of FIG. 2.
Figure 10:
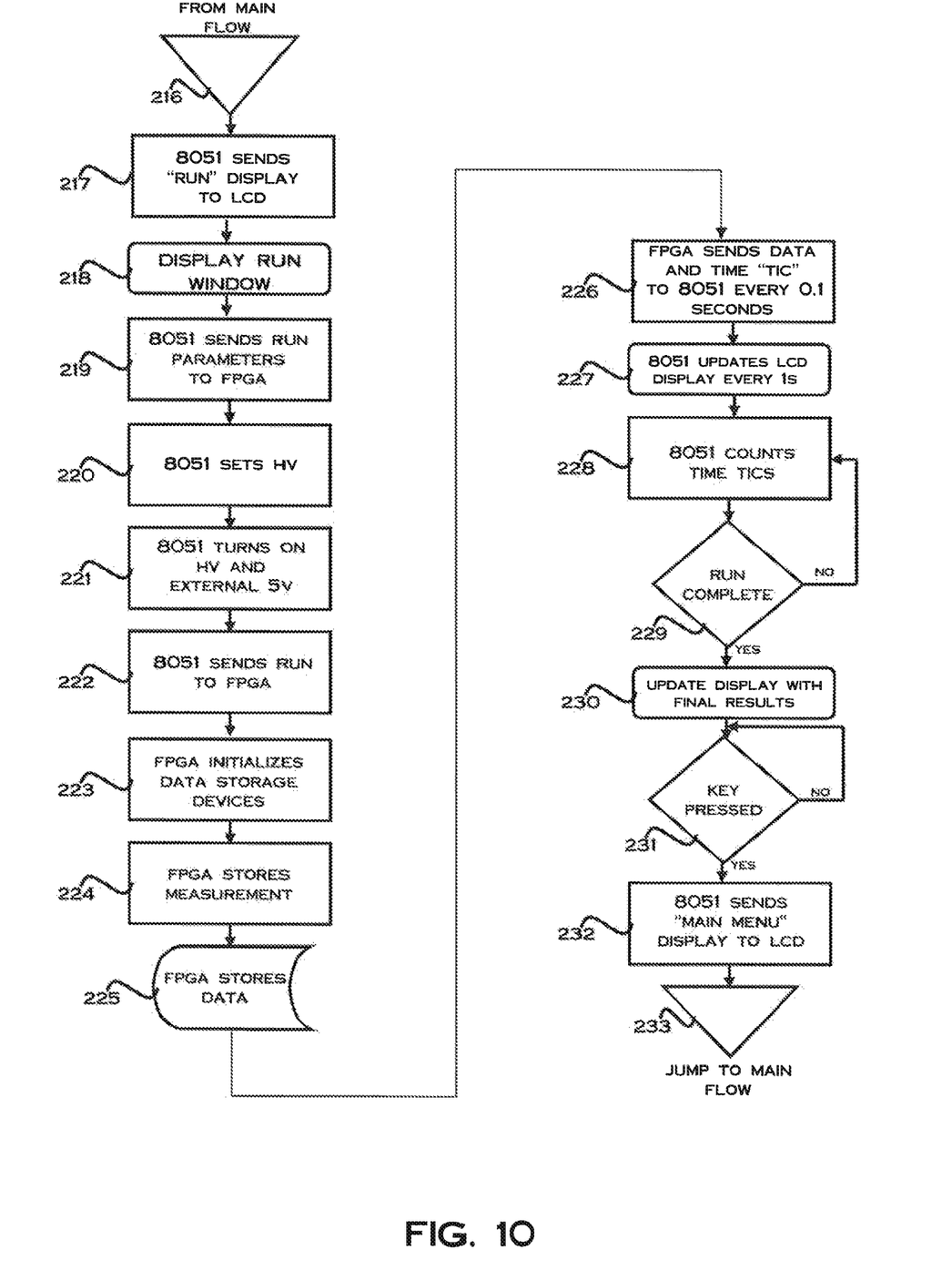

The operation method 100 of the hand-held counter 1 can be split into a main mode method 200 and a run mode method 250, as indicated in FIGS. 9 and 10, which, respectively, illustrate flow diagrams outlining main flow and run flow operating methods of the hand-held multiplicity counter 1 according to one embodiment. Referring particularly to FIG. 9 in conjunction with FIG. 2, after starting in main mode 200, as indicated in process step 201, the battery power management system detects whether external DC power is connected to the counter as indicated in process step 202. If DC power is connected, battery 7 is first charged as indicated in process step 203. The keypad is monitored for activity anytime there is DC power on the board either from the battery or from DC power input as indicated in process step 204. If a keypad is pressed by the operator (process step 205), the power supply 13 is automatically turned on and the "main menu" displayed on the LCD display 12, as indicated in process steps 206 & 207. If run is selected (process step 208) via the keypad 10, then the counter 1 jumps to run flow mode 250, as indicated in process step 216, and the counter 1 runs as will be explained in more detail below.

Figure 11A:
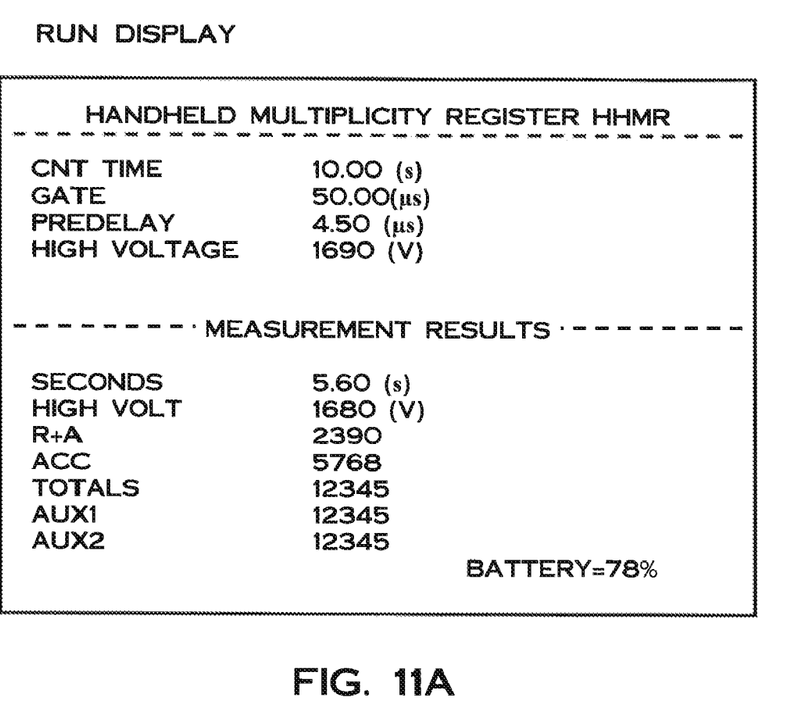
FIGS. 11A and 11B illustrates examples of "run" display and "setup" display of the hand-held multiplicity counter of FIG. 2.
Figure 11B:
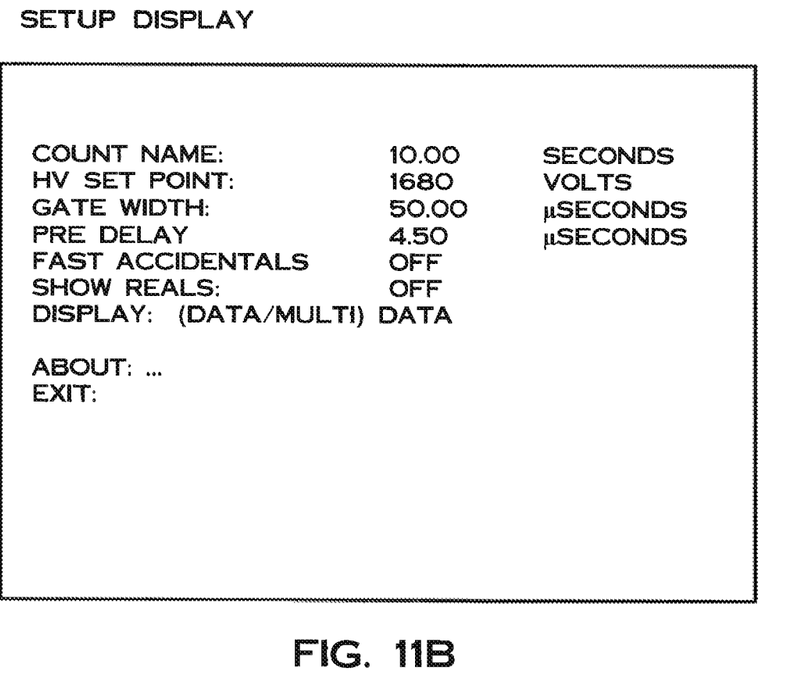

If however, "setup" rather than "run" is selected via the keypad 10, the microcontroller 2 sends the "setup" display (process step 212). A typical example of a "setup" display is shown in FIG. 11B. Thereafter, if one or more measurement parameters, such as desired HV, pre-delay or gate settings, are selected and adjusted via the keypad 10 (process step 213), the setup parameters are stored (process step 214). If however, none of the parameters are selected (process step 213) and exit is selected (process step 215), the "main menu" is redisplayed (process step 207). If neither run nor step up are selected and exit is selected (process step 210), then the method ends (process step 211).

Referring now in more detail to run flow mode 250 illustrated in FIG. 10, after jumping to run flow mode (process step 216) the microcontroller 2 sends a 'run ' or "operate" display to the LCD display 12, as indicated in step 217 of FIG. 10. An example of a "run" or "operate" display is shown in FIG. 11A. The run window is displayed (process step 218) and microcontroller 2 sends the run parameters to the field programmable gate array (FPGA) 3 (processes step 219). Thereafter, microcontroller 2, sets the HV power supply value (process step 220), turns on HV power supply 24 and LV 5V supplies 25, 26 (process step 221), and sends a run signal to the FPGA 3 (process step 222). Thereafter, FPGA 3 initializes data storage devices of the FPGA (process step 223) and then starts measurements of the input pulses (process step 224).

During measurements, FPGA 3 stores count data (process step 225) and sends the count data and time "TIC" to the microcontroller 2, typically, every 0.1 second (process step 227). The microcontroller 2 updates the display 12 with this data, typically every 1 second (process step 227) and counts time TICS until the measurement run is complete (process steps 228 and 229). Thereafter, the LCD display 12 is updated with final results (process step 230). In response to a key being pressed (process step 231), microcontroller 2 sends "main menu" display to the LCD display (process step 232) and the method jumps back to main flow mode 200 (process step 233 in FIGS. 9 and 10).

In the particular example of the main and run flow methods 200,250 set forth in FIGS. 9 and 10, some or all of the functions and parameters which are configured or programmed using the keypad 10 and LCD display 12, such as selecting "run", as indicated in process step 208, or selecting a measurement parameter, as indicated in process step 213, can alternatively be configured using an external computer connected to the USB interface 5B.

Advantageously, the method of operation of the hand-held counter of the illustrative embodiments enables an operator to perform count measurements with ease. The counter can be conveniently used at nuclear facilities for safeguarding nuclear material, process monitoring and control, nuclear waste measurements and other applications.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only.

Other variations and modifications of the present invention will be apparent to those of skill in the art, and it is the intent of the appended claims that such variations and modifications be covered. For example, whilst the illustrative embodiments are generally directed to a hand-held multiplicity counter which is capable of being hand-held in use, in alternative embodiments, the multiplicity counter whilst being portable, that is, easily or conveniently transported by hand, need not be capable of being hand-held in use. Also, whilst in the illustrative embodiments the multiplicity counter is used to count voltage pulses representing neutron events, the multiplicity counter can be used to count voltage pulses representing other events in which the user would like to obtain pulse correlation information.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A portable multiplicity counter comprising
   a housing,
   signal input circuitry and a user/computer interface integral carried on said housing, and
   processing circuitry also carried on said housing and operably coupled to said signal input circuitry and said user/computer interface, wherein said processing circuitry comprises a microcontroller and shift register circuitry operably coupled thereto; wherein said processing circuitry is configured to be operable via said user/computer interface to count input signal pulses receivable at said signal input circuitry and record time correlations thereof, and wherein said processing circuitry is configured to count and record said input pulses based on measurement parameters configurable via said user/computer interface.

2. The portable multiplicity counter of claim 1, wherein said shift register is adapted to count and record said input signal pulses in a total counting mode, coincidence counting mode and/or a multiplicity counting mode.

3. The portable multiplicity counter of claim 1, wherein said shift register circuitry comprises a field programmable gate array integrated circuit.

4. The portable multiplicity counter of claim 1, further comprising a high voltage power source and/or a low voltage power source disposed in said housing for electrically biasing one or more external detectors.

5. The portable multiplicity counter of claim 1, further comprising a battery power supply disposed in said housing for powering said portable multiplicity counter.

6. The portable multiplicity counter of claim 1, wherein said input signal circuitry comprises a plurality of input channels and signal conditioning circuitry operable via said user/computer interface.

7. The portable multiplicity counter of claim 1, wherein said user interface comprises an LCD display and keypad and/or wherein said computer interface comprises a USB interface.

8. A hand-held multiplicity counter for counting neutron events comprising
a housing,
signal input circuitry and a user/computer interface carried on said housing, and
processing circuitry also carried on said housing and operably coupled to said signal input circuitry and said user/computer interface, wherein said processing circuitry comprises a microcontroller and shift register circuitry operably coupled thereto; wherein said processing circuitry is configured to be operable via said user/computer interface to count input signal pulses receivable at said signal input circuitry and record time correlations thereof, and wherein said processing circuitry is configured to count and record said input pulses based on measurement parameters configurable via said user/computer interface.

9. The hand-held multiplicity counter of claim 8, wherein said shift register circuitry comprises a field programmable gate array integrated circuit operably connected to said microcontroller and said signal input circuitry.

10. The hand-held multiplicity counter of claim 9, wherein said field programmable gate array is further configured to count and record said input signal pulses based on measurement parameters configurable via said user/computer interface, and wherein measurement data, corresponding to said input pulse time correlations, is retrievable from said shift register circuitry via said user/computer interface using said microcontroller.

11. The hand-held multiplicity counter of claim 9, wherein said field programmable gate array integrated circuit is adapted to count at a count rate of up to about 50 Mhz in a total counting mode, coincidence counting mode and/or a multiplicity counting mode.

12. The hand-held multiplicity counter of claim 11, further comprising a high voltage power source and/or a low voltage power source disposed in said housing for electrically biasing one or more external neutron detectors to provide said input signal pulses.

13. The hand-held multiplicity counter of claim 11, wherein said user interface comprises an LCD display and keypad mounted on said housing and/or wherein said computer interface comprises a USB interface.

14. The hand-held multiplicity counter of claim 13, further comprising a rechargeable battery power supply and battery power management system disposed in said housing for powering said hand held multiplicity counter.

15. The hand-held multiplicity counter of claim 14, wherein the input mode of said signal input circuitry is selectively operable via said user/computer interface between a low voltage differential or standard TTL input mode.

16. A method of manufacturing a portable multiplicity counter comprising
integrating signal input circuitry, processing circuitry and a user/computer interface in a housing, wherein said processing circuitry comprises a microcontroller and shift register circuitry operably coupled thereto,
configuring said processing circuitry to be operable via said user/computer interface to count input signal pulses receivable at said signal input circuitry and record time correlations thereof, and to count and record said input pulses based on measurement parameters configurable via said user/computer interface.

* * * * *